Nov. 4, 1947.  W. C. LAMPHIER  2,430,347
ELECTRICAL STEAM GENERATING DEVICE
Filed Feb. 12, 1946   2 Sheets-Sheet 1
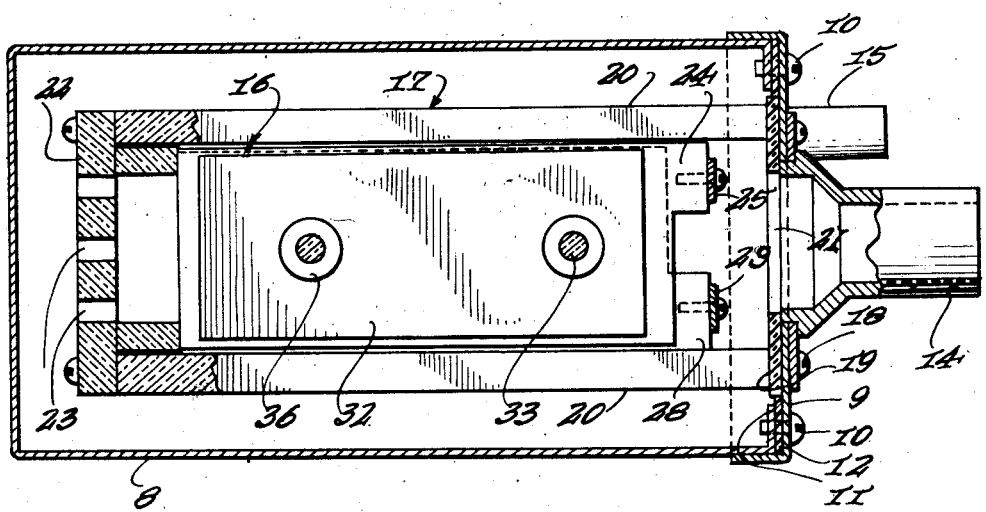
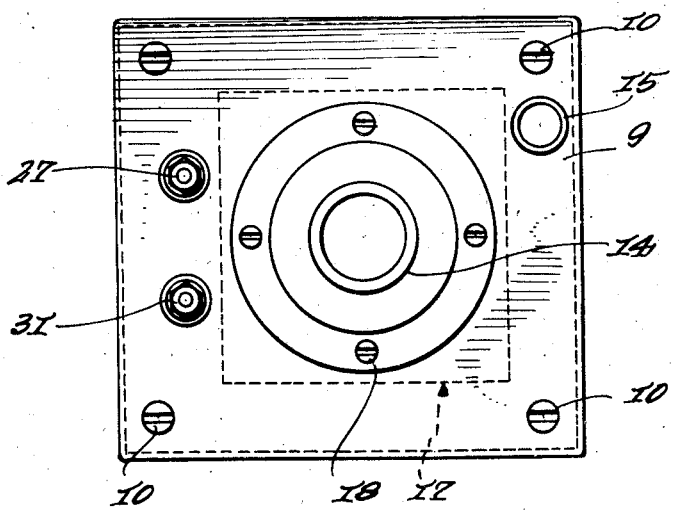
INVENTOR.
WILBUR C. LAMPHIER.
BY Clark & Ott
ATTORNEYS.

Nov. 4, 1947. W. C. LAMPHIER 2,430,347
ELECTRICAL STEAM GENERATING DEVICE
Filed Feb. 12, 1946  2 Sheets-Sheet 2
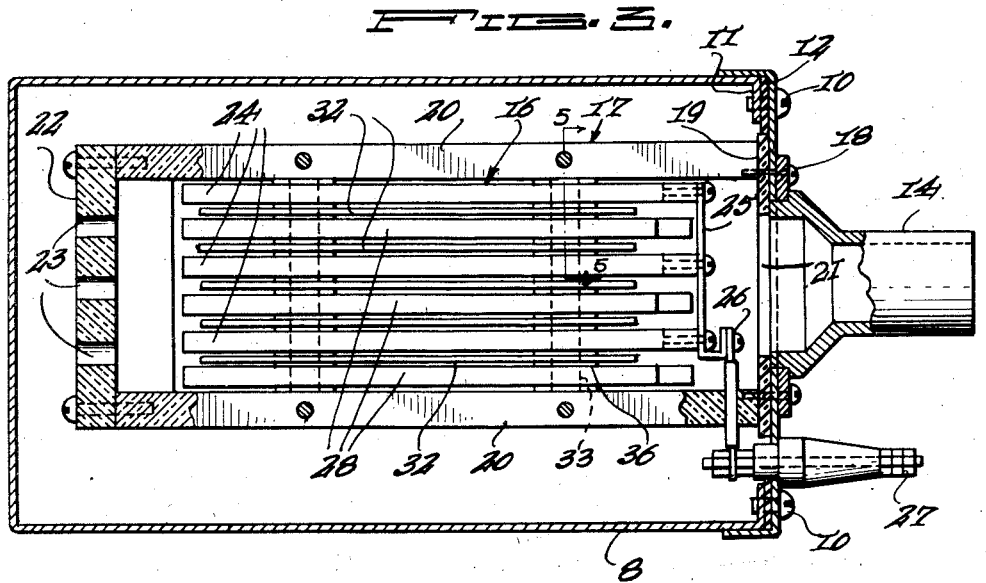
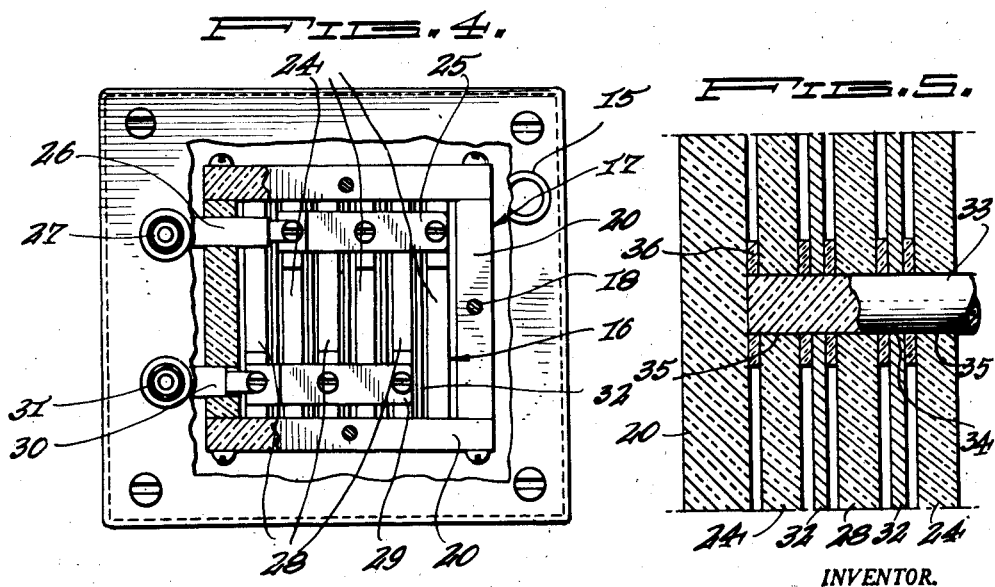
INVENTOR.
WILBUR C. LAMPHIER.
BY Clark+Ott
ATTORNEYS Patented Nov. 4, 1947

2,430,347

UNITED STATES PATENT OFFICE 2,430,347

ELECTRICAL STEAM GENERATING DEVICE

Wilbur C. Lamphier, Hillsdale, N. J.

Application February 12, 1946, Serial No. 646,973

4 Claims. (Cl. 219—40)

1

This invention relates to an electrical device for generating a vapor medium for use in heating and the like.

The invention primarily comprehends an electrical device for generating steam or other heated vapor in which the liquid to be vaporized constitutes the conductor for carrying the current between opposite electrodes and interposed therebetween in spaced relation therewith is a metallic heating element immersed in the liquid for effecting rapid vaporization of the liquid.

The invention has for a further object the provision of an electrical device for generating a heated vapor by the use of a heating element interposed between the electrodes to provide narrow channels on opposite sides of said heating element for receiving a thin column of the liquid to be vaporized whereby the same is rapidly converted into heated vapor.

The invention further has in view a device of the indicated character having a liquid reservoir disposed in surrounding relation to an insulated heating unit and having communication therewith through the bottom thereof for directing the liquid to be heated upwardly through the unit.

With the foregoing and other objects in view, reference is now made to the following specification and accompanying drawings in which the preferred embodiment of the invention is illustrated.

In the drawings:

Fig. 1 is a longitudinal sectional view of an electrical steam generating device constructed in accordance with the invention and illustrating the same in a horizontal position with the forward electrode removed.

Fig. 2 is a top plan view thereof.

Fig. 3 is a longitudinal sectional view similar to Fig. 1 taken at 90 degrees thereto.

Fig. 4 is a top plan view similar to Fig. 2 with the central portion of the top wall removed to illustrate the underlying parts.

Fig. 5 is an enlarged fragmentary sectional view taken approximately on line 5—5 of Fig. 3.

Referring to the drawings by characters of reference, the device consists of a receptacle such as a metallic container 8 of any desired configuration having a cover or lid 9 secured thereto by screws 10 engaging threaded lugs 11 affixed to the upper end of the container and compressing a gasket 12 between the container and the cover to provide a leak-proof joint therewith. The cover 9 is formed with a tubular boss 14 providing a vapor outlet adapted to be connected by suitable piping with the article to be heated

2 such as a radiator or the like and if desired the cover may be provided with a tubular boss 15 for returning the condensate to the container 8 when the vapors have condensed.

Located within the container 8 is an electrical vapor generating unit indicated generally by the reference character 16 arranged within an insulation housing 17 of vulcanized rubber or the like. The housing 17 is affixed to the cover 9 by screws 18 extending through the top wall 19 of said housing with the inner ends of the screws anchored in the side walls 20 thereof. The top wall 19 of the housing is formed with an opening 21 disposed in alignment with the tubular boss 14 through which the heated vapors pass. The bottom wall 22 of the housing is provided with a plurality of apertures 23 through which the liquid contained in the container 8 is admitted to the housing 17 and passes upwardly through the heating unit 16.

The heating unit 16 consists of a plurality of vertically disposed transversely spaced non-metallic electrodes 24 of carbon or graphite which are in the form of rectangular plates, three such plates being shown in the present embodiment. The electrodes 24 are connected in parallel at their upper ends by a conductor 25 which is connected to a conductor 26 extending through the housing 17 and secured to a terminal 27 mounted in and insulated from the cover and adapted to be connected by suitable wiring to one side of a source of current supply. A plurality of vertically disposed non-metallic electrodes 28 similar to the electrodes 24 are arranged in parallel relation therewith with one of the electrodes 24 alternating with one of the electrodes 28. The electrodes 28 are connected in parallel at their upper ends by a conductor 29 which is connected to a conductor 30 extending through the housing 17 with the outer end thereof secured to a terminal 31 mounted in and insulated from the cover 9 and adapted to be connected with the opposite side of the source of current supply.

Interposed between adjacent electrodes 24 and 28 are metallic conductors 32 preferably in the form of thin plates which are substantially co-extensive in height and width with the electrodes 24 and 28. The plates 32 may be constructed of any preferred metal which does not react with the liquid to be vaporized. The electrodes 24 and 28 and the metal plates 32 are secured together as a unit by transversely extending rods 33 of synthetic or other insulation material which rods extend through openings 34 in the said plates and through openings 35 in the electrodes 24 and 28. The rods 33 are surrounded by insulation washers 36 located on opposite sides of the plates 32 for spacing the plates from adjacent electrodes. The washers 36 are relatively narrow in thickness so as to provide narrow channels between the plates and adjacent electrodes for receiving a thin film of the liquid to be vaporized between the plates and adjacent electrodes.

From the foregoing it will be apparent that the plates 32 are secured in spaced relation from the adjacent electrodes 24 and 28 and are insulated from the electrodes. In operation each adjacent pair of electrodes being of different polarity the current will flow therebetween through the medium of the liquid in the channels between the plates and the electrodes. The passage of the current through the liquid heats the plates 32 and maintains the same in a heated condition so long as the liquid flows upwardly through the said channels to thereby cause the liquid to be rapidly converted into vapor.

What is claimed is:

1. In an electrical device for generating a heated vapor medium, a closed container having a port for the discharge of the heated vapor, a vapor generating unit arranged within said container, an insulation housing surrounding said unit and having a vapor outlet communicating with said discharge port and an apertured wall for the passage of the liquid to be vaporized from said container to the generating unit within said insulation housing, said generating unit consisting of a plurality of non-metallic electrodes spaced apart in parallel relation, means connecting alternate electrodes with a terminal mounted on said container adapted to be connected with one side of a source of current supply, means connecting the electrodes between said alternate electrodes with another terminal on said container adapted to be connected with the opposite side of said source of current supply, a metallic plate substantially the same height and width as said electrodes located between each adjacent pair of said electrodes in spaced relation therewith, insulation rods connecting said electrodes and plates in unit formation and insulation spacer elements disposed on said rods and located on opposite sides of said plates for maintaining the plates in spaced relation from the electrodes.

2. In an electrical device for generating a heated vapor medium, a closed container having a port for the discharge of the heated vapor, a vapor generating unit arranged within said container, said generating unit consisting of a plurality of non-metallic electrodes spaced apart in parallel relation, means connecting alternate electrodes with a terminal mounted on said container adapted to be connected with one side of a source of current supply, means connecting the electrodes between said alternate electrodes with another terminal on said container adapted to be connected with the opposite side of said source of current supply, a metallic plate substantially the same height and width as said electrodes located between each adjacent pair of said electrodes in spaced relation therewith, insulation rods connecting said electrodes and plates in unit formation and insulation spacer elements disposed on said rods and located on opposite sides of said plates for maintaining the plates in spaced relation from the electrodes.

3. In an electrical device for generating a heated vapor medium, a container having a port for the discharge of the heated vapor, a vapor generating unit arranged within said container and consisting of a plurality of electrodes spaced apart in parallel relation, means connecting alternate electrodes with a terminal mounted on said container adapted to be connected with one side of a source of current supply, means connecting the electrodes between said alternate electrodes with another terminal on said container adapted to be connected with the opposite side of said source of current supply, a current conducting plate located between each adjacent pair of said electrodes in spaced relation therewith to provide narrow channels between said plates and adjacent electrodes and means connecting said electrodes and plates in unit formation and in spaced apart insulated relation free from each other.

4. In an electrical device for heating a liquid, a container, a heating unit arranged in said container, said heating unit consisting of spaced electrodes, a metallic plate disposed between adjacent electrodes in spaced relation therewith and means connecting said electrodes and plate in unit formation and in insulated spaced relation to provide narrow channels on each side of said plate and between the same and the adjacent electrodes.

WILBUR C. LAMPHIER.

REFERENCES CITED

The following references are of record in the file of this patent:

UNITED STATES PATENTS

| Number | Name | Date |
|---|---|---|
| 1,999,962 | Des Rosiers | Apr. 30, 1935 |
| 1,957,070 | Ludwig | May 1, 1934 |
| 1,916,064 | Mortensen | June 27, 1933 |
| 1,706,146 | Davidsen | Mar. 19, 1929 |
| 957,667 | Fuller | May 10, 1910 |

FOREIGN PATENTS

| Number | Country | Date |
|---|---|---|
| 825,925 | France | Dec. 27, 1937 |